(12) United States Patent
Billawala et al.

(10) Patent No.: US 8,504,567 B2
(45) Date of Patent: Aug. 6, 2013

(54) AUTOMATICALLY CONSTRUCTING TITLES

(75) Inventors: Youssef Billawala, Campbell, CA (US); Sudarshan Lamkhede, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 283 days.

(21) Appl. No.: 12/861,774

(22) Filed: Aug. 23, 2010

(65) Prior Publication Data
US 2012/0047131 A1    Feb. 23, 2012

(51) Int. Cl.
*G06F 17/30* (2006.01)
(52) U.S. Cl.
USPC .......................................................... 707/736
(58) Field of Classification Search
USPC ............................ 707/999.003, 100, 101, 736
See application file for complete search history.

(56) References Cited

U.S. PATENT DOCUMENTS

| 6,360,215 | B1 | 3/2002 | Judd et al. |
| 7,698,331 | B2 | 4/2010 | Carson, Jr. et al. |
| 2001/0018698 | A1 * | 8/2001 | Uchino et al. ................. 707/533 |
| 2005/0038775 | A1 | 2/2005 | Haveliwala et al. |
| 2006/0062492 | A1 * | 3/2006 | Masuichi et al. ............. 382/305 |
| 2008/0133482 | A1 | 6/2008 | Anick et al. |
| 2008/0215597 | A1 * | 9/2008 | Nanba ........................... 707/100 |
| 2009/0063567 | A1 * | 3/2009 | Matsunaga ................. 707/104.1 |
| 2009/0187516 | A1 | 7/2009 | Kanungo et al. |
| 2009/0210381 | A1 | 8/2009 | Singh |
| 2010/0057710 | A1 | 3/2010 | Kanungo et al. |
| 2010/0125570 | A1 | 5/2010 | Chapelle et al. |

* cited by examiner

*Primary Examiner* — Bai D. Vu
(74) *Attorney, Agent, or Firm* — Hickman Palermo Truong Becker Bingham Wong LLP (57) ABSTRACT

An information retrieval system and computer-based method provide constructing a title for a search result summary of a document through title synthesis, wherein the title is suitable for use in assessing the relevance of the summarized document to a query. Meaningful keywords or key phrases (title components) about the document are Obtained. The title components are classified into pre-established title component classes. When a query is input to which the document is relevant, a title for the document is constructed by arranging title components selected from title component classes to maximize a title utility function. The title utility function may be a query-dependent grade. In addition to the query, the title utility function may also account for constraints under which the title is to be presented to a user.

26 Claims, 7 Drawing Sheets

301 — Query: dodge 3500 hubcaps

Dodge Ram 3500 Hubcaps - HubcapMike.com
Hubcaps >> Wheel Skins >> Dodge WheelSkins >> Ram 3500 Wheel Skins > ... Mike says that selling wheelskins and hub caps is a fun business, and he's been ...
hubcapmike.com/.../ws-57-ram-truck-3500-17c.html 302 — Query: apa in-text citations

APA In-Text Parenthetical Citations - Duke University Libraries
APA in-text ... in-text citations correspond to the full bibliographic entries found in a ... is usually spelled out each time it appears in a text citation. ...
library.duke.edu/research/citing/within/apa.html 303 — Query: cotton-wool spots

Cotton-Wool Spots - Wills Eye Hospital
Cotton-wool spots are tiny white areas in the retina, the layer of light-sensing ... Cotton-wool spots are also a common sign of infection with the Human ...
www.willseye.org/patients/topics/retina/cotton/index.html

AUTOMATICALLY CONSTRUCTING TITLES

TECHNICAL FIELD

The present invention relates generally to data processing systems and more particularly to a data processing system implementing a method for constructing titles for search results summaries through title synthesis.

BACKGROUND

Computers are well-suited for searching vast amounts of information. One type of computer system used to search for information stored in computers is an "information retrieval system". Generally, in operation, an information retrieval system accepts as input a statement of an information need (i.e., a query) and provides as output a search result identifying a set of one or more documents that the information retrieval system determined were relevant to the query. The documents may include text documents, multi-media documents, web pages, images, audio tracks, videos, and other types of information. An Internet search engine is an example of one type of information retrieval system.

Figure 1:
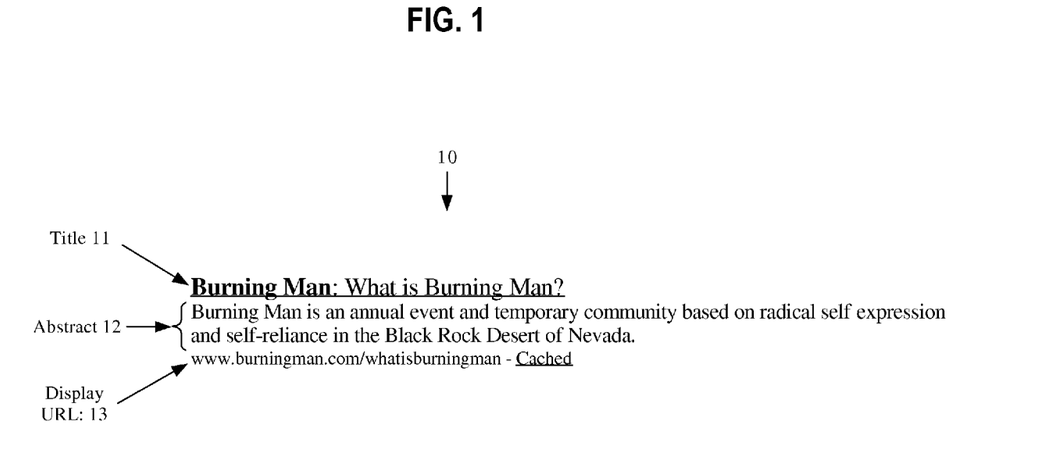
FIG. 1 depicts an example web search result summary in Title-Abstract-URL (TAU) format.

A search result provided by an information retrieval system in response to a query often identifies more than one document as being relevant to the query. In such a case, the search result may provide a textual summary of each identified document in lieu of providing the actual documents themselves. The textual summaries can then be reviewed by a human user who, based on the summaries, decides which documents identified in the search result appear to be most relevant to the query. For example, in the context of web search engines, a search result may comprise a web page presenting an ordered listing of a web search result summaries listed in order of decreasing relevance. Often a web search result summary is presented in Title-Abstract-URL (TAU) format. FIG. 1 depicts an example web search result summary in TAU format. As shown in FIG. 1, the search result summary 10 comprises a title 11, a short keywords-in-context extractive summary or abstract 12, and a Uniform Resource Locator (URL) 13. In this example, the summarized document is a web page containing content about an annual event called "Burning Man" that takes place in a Nevada desert retrieved in response to a query "burning man".

The title of a search result summary is of particular significance to the user in efficiently and accurately assessing the relevance of a summarized document. For one, the title often appears before other summary information as a heading for the summary. Thus, a user is most likely to read the title before reading any other summary information. Second, the user would ideally be required to read no more than the title to accurately determine how relevant the document is to the inputted query. Given the significance of the title to the user, it is desirable for information retrieval systems to present good quality titles in search result summaries of documents.

One possible approach for providing a good quality title for a search result summary of a document is to provide the title assigned by the creator or author of the document. For example, a web search engine could select, for a web page document, the Hypertext Markup Language Title (HTML) title given to the web page to use as the title in the search result summary of the web page. However, not all documents are given titles by their creator or author. Even where a title is given, the given title may be uninformative, irrelevant, not presentable, or otherwise sub-optimal.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description sets forth embodiments for a web search engine. However, this description should not be interpreted as limiting the use of the embodiments to any one particular application or any one particular type of data processing system. Rather, the embodiments may be utilized for a variety of different applications and in a variety of different contexts including information retrieval systems generally or any other system or application in which presenting a title in a summary of a document may be useful.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. Overview of Title Synthesis

An information retrieval system and computer-based method provide constructing a title for a search result summary of a document through title synthesis, wherein the title is suitable for use in assessing the relevance of the summarized document to a query.

In one embodiment, the system obtains meaningful keywords or key phrases (title components) about the document; and classifies each title components into one or more of a plurality of pre-established title component classes. The title components may be automatically obtained for the document from available sources either before or at the time the document is made available for indexing by the system. When a query is input to the system to which the document is relevant, the system constructs a title for the document by arranging title components selected from title component classes, to maximize a title utility function. The title utility function may be a query-dependent grade. In addition to the query, the title utility function may also account for constraints under which the title is to be presented to a user of the system.

Figure 2:
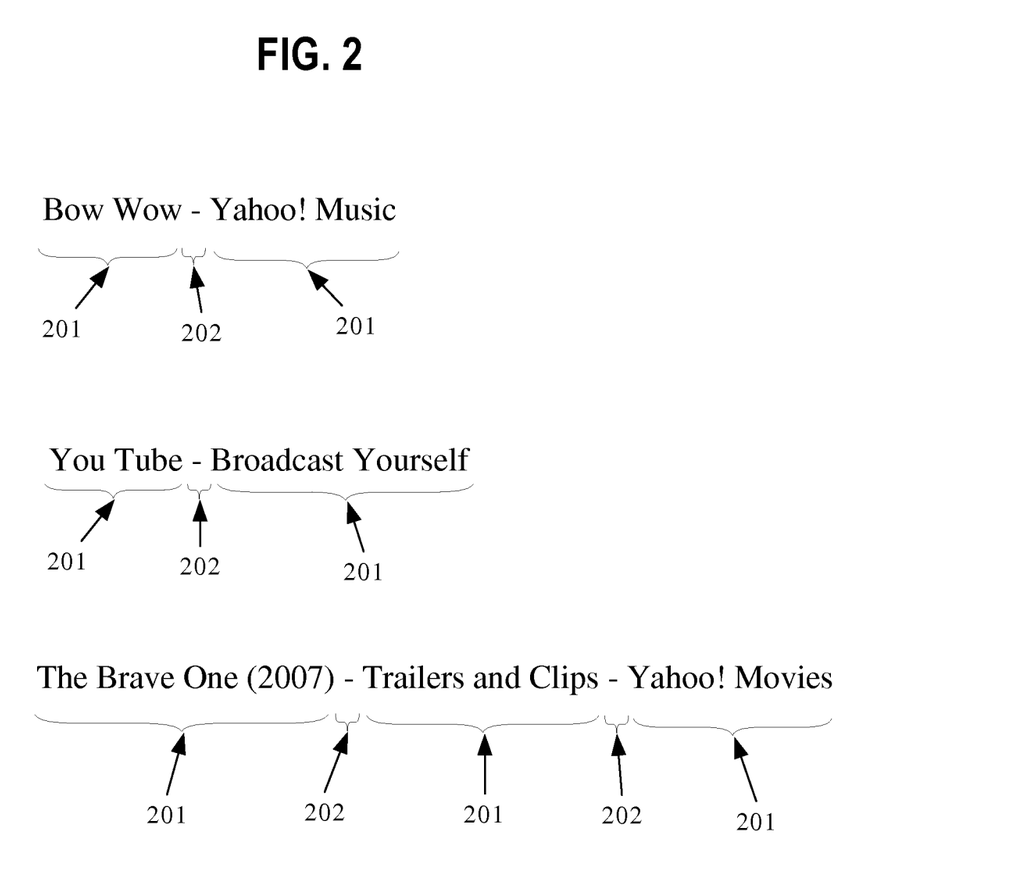
FIG. 2 depicts three example titles including example title components and example separators.

Instead of treating a title as a monolithic piece of text, the title synthesis system described herein views a title as a composition of one or more meaningful words or phrases thereby providing greater flexibility and control over title construction. In one embodiment, a title constructed through title synthesis comprises one or more title components delimited by one or more textual separators and has various characteristics including high query term coverage, query terms presented towards the beginning of the title, a short length, and consistent presentation and formatting with respect to other presented titles. The system uses title components and separators as the "building blocks" for synthesizing and constructing titles for search result summaries. The system obtains title components from various textual information sources and then combines the title components into synthesized titles in light of a statement of a user's information need (i.e., query) and search result presentation constraints. FIG. 2 depicts three examples titles including example title components 201 and example separators 202.

In one embodiment, title synthesis includes two phases: 1) an offline/index-time phase, and 2) a run-time/query-time phase.

In the offline/index-time phase, the system obtains title components for each document indexed by the system. The title components may be obtained from virtually any textual information sources about the document including the document itself, other documents, human input, etc. Obtaining title components from information sources may include classifying obtained title components into one or more pre-established title component classes according to a title component classification function. The title component classification function may be a metric of confidence that a given title component is of a particular title component class.

Also in the offline/index-time phase, the system obtains a set of title templates that govern construction of titles from title components. A title template may be comprise one or more title component class "slots" delimited by one or more textual separators. Each slot in a title template may correspond to one of the plurality of pre-established title component classes.

During the run-time/query-time phase, a query is input to the system and the system identifies documents relevant to the inputted query. For each relevant document to be summarized in a search result for the query, the system generates a title for the document. Generating a title for the document includes constructing a title through title synthesis.

Conceptually, the task of constructing a title for a document d through title synthesis can be stated as: construct a title t, given a query q, a set of title components C obtained for document d, and a set of search result presentation constraints P, such that the utility of the title t to the user in determining whether the document object d is relevant to the user's query q is maximized. The process of constructing a title through title synthesis may include selecting a set of one or more candidate title templates T' from a set of available title templates T. The selection of set T' from T may be based on the query q, the set of available title components C, the content or type of the document d, and presentation constraints P. Candidate title template in set T' may be completed with title components C to produce a set of candidate titles. Completion of a candidate title template with title components C may proceed in an iterative and progressive manner on a slot by slot basis in which a initial slot of the candidate title template is completed with a best available title component C from the corresponding title component class, a next slot is completed with a best available title component C from the corresponding title component class taking into account how all existing slots have been completed, and so on until all slots of the candidate title template are completed with title components C, to maximize a title utility function. The title utility function may be a query-dependent grade. In addition to the query, the title utility function may also account for constraints under which the title is to be presented to a user of the system.

Existing systems select a title for a document from a pre-established set of candidate titles. Thus, in these systems, the utility of the selected title is limited by the utility of the available candidates. In contrast to these systems that treat a title as monolithic piece of text, title synthesis techniques described herein treat a title as a composition of one or more meaningful components thereby providing greater flexibility and control over title construction. Using the title synthesis techniques described herein, an information retrieval system can construct a title for a document that is better optimized against a user's query and presentation constraints.

These and other benefits of the techniques will be apparent from the following description and the drawings, and from the claims.

II. Observations on Good Quality Titles

Good quality titles for a search result summaries allow a user to quickly and accurately identify which documents identified in a search result are most relevant to the user's query. As used herein, the term "query" refers broadly to any data representing an expression of a user's information need or intent. For example, a query may comprise one or more query terms or keywords inputted by the user. The following three observations are made on some characteristics of a good quality title.

First, a user may consider a document identified in a search result as relevant to a query if 1) the title of a search result summary of the document object contains one or more of the user's query terms and 2) query terms are presented towards the beginning of the title. Thus, even if a document identified in a search result is highly relevant to a user's query, the user might consider the document to be irrelevant if the title fares poorly on these two criteria. For example, a web query submitted to a web search engine might contain the query term 'monster'. The user who submitted the web query might be interested in obtaining a search result summary that hyperlinks to the home page of the web site hosted at the 'monster.com' Internet domain. A title in a search result summary of "Find Jobs. Build a Better Career. Find Your Calling | Monster.com" may be perceived by the user as less relevant than a title of "Monster.com | Find Jobs. Build a Better Career. Find Your Calling" because of the placement of the query term in the title. This is so even though both titles may be presented as active or live links that hyperlink to the same web page. Similarly, if the user query is "SI" and the user is searching for a hyperlink to "http://sportsillustrated.cnn.com", then a title of "SI.com" may be considered by the user to be a good quality title because it includes the query term towards the beginning of the title. However, if the query were, instead, "sports illustrated", then that title does not include any of the query terms, perhaps inaccurately creating the impression to the user that the document object summarized by the title is not relevant to the user's query. Title synthesis techniques described herein may be used to construct more "scan-able" titles. A highly scan-able title is a title that includes query terms in optimal locations within the title allowing a user to quickly and accurately assess the relevance the document summarized by the title to the user's query.

Second, while a long title can be more informative about the content of the summarized document object than a relatively shorter title, users may prefer concise, compact, easy-to-read titles over lengthy, wordy titles. Further, the length of a title may be constrained by search result presentation constraints such as, for example, whether the search result is being displayed on a relatively larger workstation computer monitor or on a relatively smaller display of a handheld electronic device such as a smart phone. One possible solution for generating a shorter title is to truncate the title as whole. However, this can result in a malformed or an otherwise less meaningful title if the truncation is performed bluntly or inaccurately. Title synthesis techniques described herein may be used to construct titles that conform to presentation constraints such as length restrictions without necessarily requiring truncation.

Third, consistent formatting and presentation of titles in search results summaries allows users to more easily and efficiently scan a search result for relevant documents, thereby improving the user's experience with the information retrieval system. Title synthesis techniques described herein may be used to present titles in a consistent presentation format.

II.A. Examples of Good Quality Titles

Figure 3:
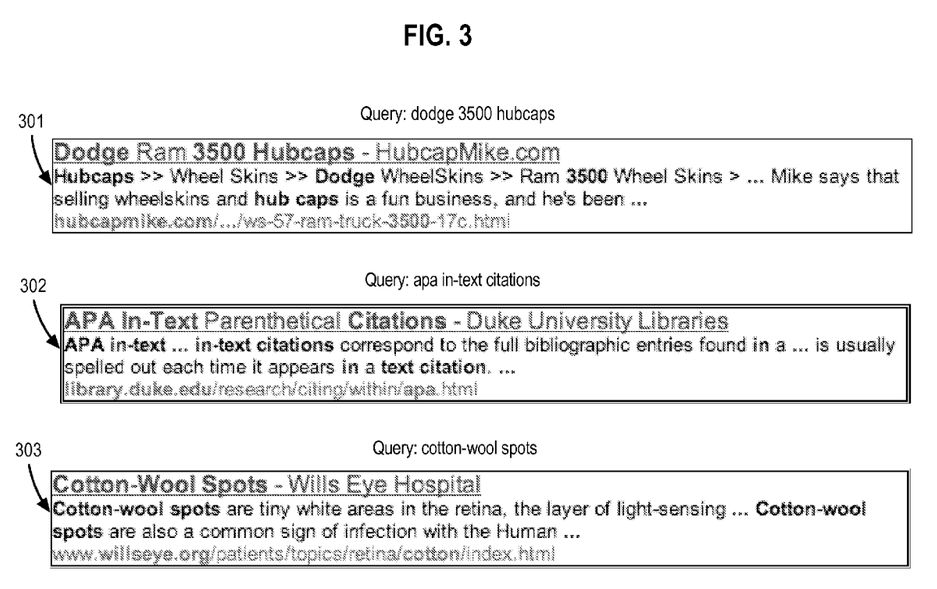
FIG. 3 depicts three example good quality titles generated by a title synthesizer system.

FIG. 3 illustrates three example good quality titles 301, 302, and 303 generated using techniques described herein. The examples depicted in FIG. 3 were generated by a web search engine employing techniques described herein. The query for which an example was generated by the web search engine is shown above the example.

In example 301, the query input to the web search engine includes the query terms 'dodge', '3500', and 'hubcaps', in that order. The web search engine identified a web page available from the web site hosted at 'hubcapmike.com'. As used herein, the term '(web) site' refers to a collection of web pages addressable at an Internet domain name, such as, for example, 'hubcapmike.com' or 'yahoo.com'. The title generated for search result summary 301 includes the web page topic "Dodge Ram 3500 Hubcaps" and the web site name 'HubcapMike.com'. The example illustrates how adding the web page topic to the web site name in a title can emphasize the relevance of the web page to the inputted query.

Example 302 illustrates how including a well-known and reliable web site name in a title can enable a user to more easily identify trustworthy content. In example 302, the query input to the web search engine includes the query terms 'apa', 'in-text', and 'citation'. The web search engine identified a web page available from the Duke University Library web site. Instead of including only the web page topic in the title, the web search engine also included the web site name of 'Duke University Libraries' in the title, thereby enabling a user to efficiently determine that the web page summarized by the title is from a well-known and reliable source. In this example, a well-known and reputable university.

Further, including web site names in titles provides benefits in countries or locales whose primary character set is not ASCII-based, such as, for example, in China, Japan, Korea, and other Asian countries. In such countries and locales, the Uniform Resource Locator (URL) for a web site is likely to be ASCII-based. Therefore, displaying the URL in a web search result summary is not likely to be useful to many users. In contrast, according to techniques described herein, a web site name can be generated in a native character set. Such a web site name can then be included in a search result summary title, thereby improving users' experience with the web search engine in non-ASCII-based locales and countries.

Example 303 illustrates how placing query terms towards the beginning of a title can improve the perceived relevance of the underlying document object. Example 303 further illustrates how such placement can improve users' efficiency in identifying relevant document objects. In example 303, the query input to the web search engine includes the query terms 'cotton', 'wool', and 'spots'. The title generated for the search result summary includes the web page topic 'Cotton-Wool Spots' before the web site name 'Wills Eye Hospital'. A user viewing the search result summary is likely to read the title of the summary before any other summary information because the title is presented before all other summary information. Similarly, the user is likely to read the beginning of the title before the remainder of the title. In this example, the beginning of the title is virtually identical to the inputted query. Thus, in this example, the user can determine that the underlying web page is relevant to the inputted query without having to read anything more than the beginning of the title.

These examples illustrate but a few of the characteristics of good quality titles. Using title synthesis techniques described herein, titles also having other desirable characteristics may be generated. These other desirable characteristics include, for example, standardization of title formatting and presentation, lack of repetition of title components within a title, and lack of truncated titles or truncated title components.

III. Exemplary Title Synthesis Operating Environment

To aid in understanding embodiments of the invention, techniques for constructing a title for a search result summary of a document through title synthesis are described in the context of an exemplary web search engine. It will be apparent, however, that the techniques may be implemented by other types of systems and are not limited to being implemented by an information retrieval system or a web search engine.

Figure 4:
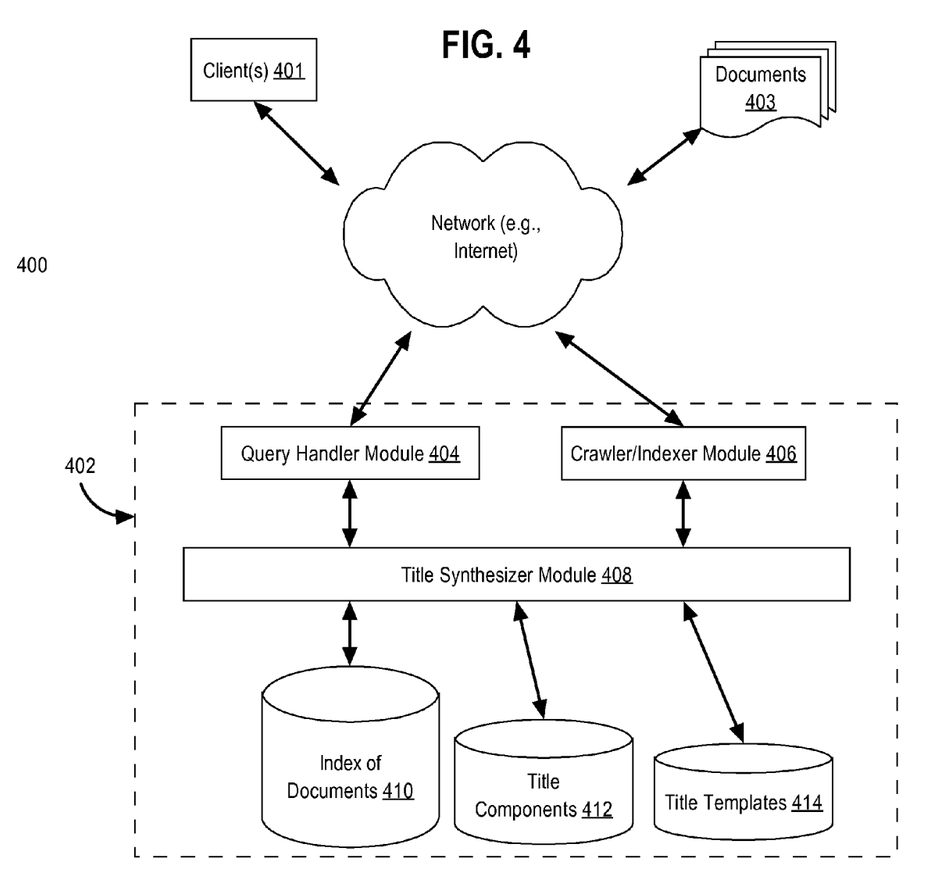
FIG. 4 is a high-level block diagram illustrating a web search engine environment that includes a web search engine system incorporating a title synthesizer system.

FIG. 4 illustrates an exemplary web search engine environment 400 that includes a web search engine system 402 having a query handler module 404, a crawler/indexer module 406, and a title synthesizer module 408. These modules may be implemented as software residing a computer memory that directs a computer processor to perform computations. These and other modules may be run on the same computer system, or may be distributed across multiple computer systems.

Crawler/indexer module 406 crawls web sites accessible on a network (e.g., the Internet) for the purpose of identifying documents 403 (e.g., web pages) available from those web sites. The crawler/indexer 406 maintains an index 410 of identified documents. In general, index 410 associates keywords with identifiers of documents so that the query handler module 404 can efficiently identify documents that are relevant to keyword queries input by clients 401. In the context of web search engines, the identifiers of documents stored in index 410 may be Uniform Resource Locators (URLs) for the documents. However, embodiments of the invention are not limited to using only URLs to identify indexed documents and any suitable identifier may be used.

III.A. Title Components

Crawler/indexer module 406 and/or title synthesizer module 408 populates a database with title components 412 obtained for documents 403 indexed in index 410. A title component obtained for a document is a meaningful keyword or key phrase that describes, characterizes, or otherwise summarizes the document. Title components for a document can be obtained from virtually any textual information source about the document. Such information sources may include, for example, the document itself, other documents such as web pages that hyperlink to the document, URLs, external data, human input, etc. Documents 403 indexed in index 410 may each be associated with a set of obtained title components 412 through an identifier of the document such as the document's URL.

III.B. Title Component Classes

In one embodiment, crawler/indexer module 406 and/or title synthesizer module 408 classifies each title component in the set of title components associated with a document into one or more of a plurality of pre-established title component classes. The title component classes are generally based on the semantic types of title components available from the textual information sources. For example, in a web search engine, the following title component classes may be used to classify title components obtained for web page documents:

Site Name: A plain language name of the web site from which the document object is available. For example, the web site yahoo.com may have a Site Name of "Yahoo!" or "yahoo.com".

Site Caption: A marketing tag, motto, or slogan of a web site. For example, the "The Free encyclopedia" for wikipedia.com.

Site Description: A plain language description of the web site. For example, for ign.com "Video Games, Cheats, Movies, and more".

Site Section Header: The section of the web site from which the document object is available for those web sites that arrange content into different sections. For example, "BBC-Somali.com | Wararka" is the site section header for "bbc.co.uk/somali".

Topic: A plain language description of the central idea or gist of the content of the document object.

Content Type: A plain language description of the type of content, layout, or interaction the document object offers to users.

Author: The author of the document object.

Location: The location from which the document object was published.

Date: A date associated with the publication of the document object on a web site.

The above are just some examples of possible title component classes into which title components obtained for a document may be classified; embodiments of the invention are not limited to any particular set of title component classes.

In one embodiment, each title component for a document is classified according to a title component classification function. For a given title component and a given title component class, the title component classification function is a metric of confidence that the given title component belongs to the given title component class. A title component may be classified into more than one title component class. Title components for a document within a title component class may be ranked within the title component class according to their confidence metrics.

III.C. Title Templates

Web search engine 402 also includes title template database 414 storing one or more title templates that govern how titles are constructed from title components 412. A title template comprises one or more title component class "slots" delimited by one or more textual separators. Non-limiting examples of textual separators that can be used in a title template include the colon ':', the double colon '::', the semicolon ';', the em-dash (or long dash) '—', the en-dash (or short dash) '-', the slash '/', and the backslash '\'. Each slot in a title template corresponds to one of the pre-established title component classes. For example, a title template for a web page could be "<Page Topic>-<Site Name>", where <Page Topic> and <Site Name> are title component class "slots" that each refer to a title component class.

Clients 401 include any computing devices suitable for communicating over a network. Non-limiting examples of such computing devices include desktop computers, server computers, and mobile computing devices such as cell phones, smart phones, personal data assistants (PDAs), and tablet computing devices. In operation, a client 401 submits a statement of an information need (i.e., a query) over a network to query handler 404 of web search engine 402. The query comprises one or more words or phrases that express the information need. The submission of the query over a network to query handler 404 may be made in accordance with a networking protocol such as, for example, the HyperText Transfer Protocol (HTTP). The submission may include, in addition to the query, data that indicates presentation constraints of the client 401 that made the submission. For example, the submission may indicate, among other information, character sets that the client is capable of presenting to a user, natural languages that a user of the client is capable of reading, the type of client application making the submission (e.g., a web browser), the type of client computing device making the submission (e.g., a mobile device), the size of the display device associated the client computing device making the submission, etc. Title synthesis system 408 can use query information and presentation constraint information to guide construction of synthesized titles. For example, where appropriate, title synthesis system 408 can select, for inclusion in synthesized titles, title components that match a user's query terms. As another example, title synthesis system 408 can select a shorter title template for synthesized titles that are to be displayed on small computer displays such as the displays of some mobile devices.

According to one embodiment, upon receiving a query from a requesting client 401, query handler 404 consults index 410 to determine document objects 403 that are relevant to the query. Each document object in the result set may be associated with an identifier such as, for example, a URL of the document object. The query handler 404 returns result data to the requesting client identifying the documents in the result set in summary form. Documents in the result set are each summarized in a summary format such as, for example, in TAU format. A summary of a document in the result data may include a title constructed by title synthesizer 408.

According to one embodiment, to produce the result data provided to the requesting client, query handler 404 invokes title synthesizer 408 for each document in the result set. The process of constructing a title for a document object includes title synthesizer 408 selecting one or more title templates from title template database 414. This selection of title templates can be based on any number of factors including any combination of explicit mapping(s) between the document and title templates in title template database 414, the query, presentation constraints, the content of the document object, and the title components in title component database 412 that are available for the document object. The set of one or more title templates selected for the document object is referred to herein as the candidate set of title templates for the document.

According to one embodiment, once the set of candidate title templates is selected for a document, title synthesizer 408 selects title components to complete the candidate title templates from the set of title components associated with the document. This selection is made in order to complete each of the candidate title templates, and thereby to produce a set of candidate titles. Each of the candidate titles, along with any other pre-existing candidate titles, is scored according to a query-dependent title utility function. The highest scoring candidate title is selected as the title to include in the summary of the document object.

According to one embodiment, selecting classified title components to complete candidate title template includes identifying the one or more title component class slots that make up the candidate title template. For example, in the candidate title template "<Separator><Site Name>" selected for a web page document object, <Page Topic> and <Site Name> are the title component class slots. It should be noted that names of title component classes are included in the example title templates described herein to aid in understanding embodiments of the invention. However, it should be understood that representation of a title template by a computer may take many forms. For example, a title template may reference a title component class by a numerical identifier of the title component class instead of by the name of the title component class.

According to one embodiment, once the title component class slots of a title template are identified, title components associated with the document in title component database 412 are selected based on the identified title component slots to maximize a title utility function. This selection process proceeds on a slot by slot basis. Selection of a title component from a title component class may be based on the query and presentation constraints. For example, a title component in a title component class that contains query terms may be selected over one that does not contain query terms. As another example, a shorter title component in a title component class may be selected over a lengthier title component.

Once title synthesizer 408 has constructed titles for each document object in the result set, result data is returned to the requesting client. The returned result data contains summaries of each of the document objects in the result set, including the titles constructed by title synthesizer 408.

Although shown separately in FIG. 4, title synthesizer module 408 may be implemented as part of query handler module 404 and/or crawler/indexer module 406. Thus, functionality of title synthesizer module 408 may be performed by the same process or processes that perform functionality of query handler module 404 and/or crawler/indexer module 406. Similarly, while shown as three separate logical databases in FIG. 4, database 410, database 412, and database 414 may be implemented as part of the same physical database, or as part of multiple physical databases.

IV. Title Synthesis Module Basic Architecture

Figure 5:
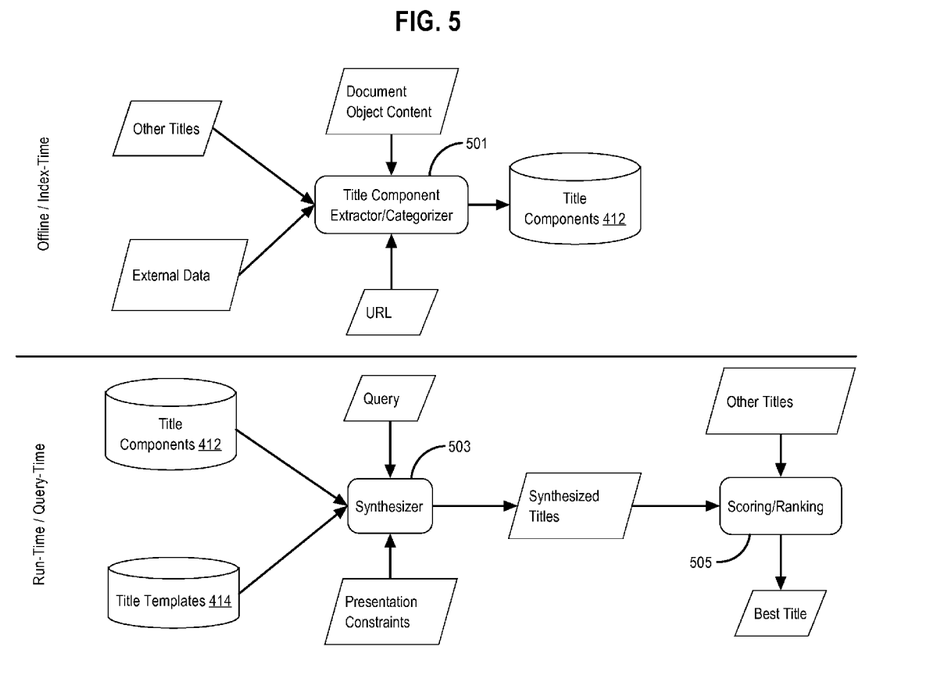
FIG. 5 is a block diagram illustrating a title synthesizer system in further detail.

FIG. 5 is a block diagram illustrating the title synthesis module 408 in further detail. As shown, the title synthesis module 408 includes a title component extractor and classifier module 501, a title synthesizer module 503, and a title scoring and ranking module 505.

Title component extractor/classifier module 501 defines a set of title components 412 that serve as the building blocks of titles. A task of title component extractor/classifier 501 is to obtain meaningful words and phrases (title components) for use by synthesizer 503 in constructing titles. According to one embodiment, extractor/classifier 501 obtains title components by parsing textual information sources and identifying and extracting meaningful words and phrases from the textual information sources and/or by having the title components provided as input to the extractor/classifier 501. In one embodiment, title components provided as input serve as training data for an automated supervised machine learning algorithm that parses textual information sources to identify and extract title components.

Another task of title component extractor/classifier 501 is to classify or categorize obtained title components into one or more title component classes. A title component may be classifier into more than one title component class. In one embodiment, an obtained title component is classifier into title component classes based on the semantic type of the title component. Each semantic type of a title component generally corresponds to a type of textual information about the document object that a user would consider useful is assessing the relevance of the document object.

Synthesizer 503 accepts, as input, a query and search result presentation constraints. For each document object to be summarized in a search result returned in response to the query, synthesizer 503 constructs a set of one or more titles for the document object by selecting one or more title templates from title template database 414 and completing each selected title template with title components selected from title component database 412. Selection of title templates and construction of titles by synthesizer 503 can be based on the query and the search result presentation constraints. The titles produced by synthesizer 503 for a document object, along with any other titles produced for the document object by other systems, are scored and ranked by scoring/ranking module 505. The best-scoring title is chosen as the title to present in the search result summary for the document object. Scoring/ranking module 505 can also score and rank the synthesized titles based on the query and the search result presentation constraints.

V. Summary of an Overall Methodology

Figure 6:
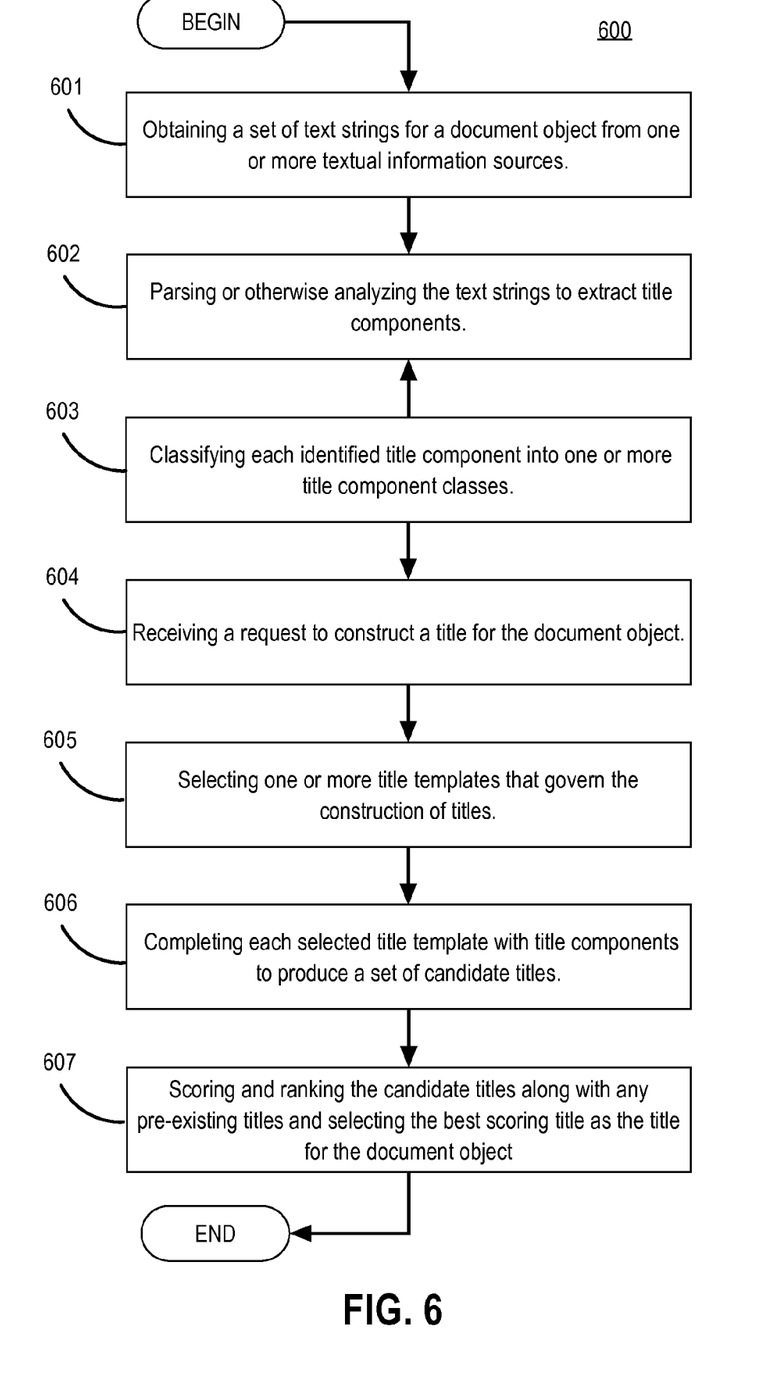
FIG. 6 comprises a flowchart providing a summary of a methodology for generating titles for search result summaries of documents through title synthesis.

FIG. 6 provides a summary of an overall methodology 600 for generating good quality titles for search result summaries. The methodology is primarily described with reference to the flowchart of FIG. 6. Each block within the flowchart represents both a method step and an element of an apparatus for performing the method step. For example, in an apparatus implementation, a block within a flowchart may represent computer program instructions loaded into memory or storage of a general-purpose or special-purpose computer. Depending upon the implementation, the corresponding apparatus element may be configured in hardware, software, firmware, or combinations thereof.

The following method steps occur in the context of a single document object that has been indexed or is about to be indexed, at which time the title synthesis system is ready to define a set of title components that will serve as the building blocks for constructing titles for the document through title synthesis. In a practical embodiment, however, these steps are repeated, perhaps concurrently, for each document in a set of search result documents. The method steps are as follows.

Defining a set of title components for the document object begins at step 601 with the title synthesis system obtaining a set of text strings for the document object from one or more textual information sources. Virtually any textual information source can serve as a source of a text string; embodiments of the invention are not limited to any particular textual information sources. In general, however, it is desirable to obtain text strings that are relevant to the content of the document object. Accordingly, it is expected that certain textual information sources will be preferable to others. For example, for a web page document object, good textual information sources of text strings often include the text of the web page itself and anchor text in other web pages that hyperlink to the web page. The process of obtaining text strings for a document object by the title synthesis system can occur in any suitable manner such as, for example, through human data entry or through an automated process such as an automated machine learning process that parses and extracts text strings from textual information sources based on training data.

At step 602, the title synthesis system parses or otherwise analyzes the text strings obtained for the document object to identify title components. Any number of techniques may be used to identify title components from a text string; embodiments of the invention are not limited to any particular techniques. According to one embodiment, each text string is parsed to produce a set of tokens. Then each token is classified as either a separator token or a non-separator token based on surface-level features of the token. For example, a token may be classified as a separator token or a non-separator token based on whether the token is a sequence of one or more well-known separator characters such as the colon ':', the semicolon ';', the em-dash (or long dash) '—', the en-dash (or short dash) '-', the slash '/', and the backslash '\'. Other surface-level features that may be considered to determine whether a token is a separator token or a non-separator token include the types of a number of previous characters and a number of following characters adjacent to the token in the text string, the length of the token, position of the token in the text string, etc. Non-separator tokens identified from a text string are merged to form a title component. For example, the text string "Movie Review | 'Ondine': Man Meets Mermaid (There's a Catch)" might be obtained for a web page document object from the anchor text of a hyperlink to the web page included in another web page. One possible title component that could be produced from this text string is "Movie Review 'Ondine' Man Meets Mermaid", with the tokens '|', ':', and "(There's a Catch)" being classified as separator tokens.

At step 603, the title synthesis system classifies each identified title component into one or more title component classes. Title components may be classified based on virtually any criteria; embodiments of the invention are not limited to any particular manner or method of classifying title components, or limited to any particular set of title component classes. According to one embodiment, classification of a title component is based on a title component classification function. For a given title component and a given title component class, the title component classification function is a metric of confidence that the given title component belongs to the given title component class. A title component may be classified into more than one title component class. Title components for a document within a title component class may be ranked within the title component class according to their confidence metrics.

At step 604, a request is made for the title synthesis system to generate a title for the document object. Such request may be in the form of an invocation on an Application Programming Interface (API) provided by the title synthesis system. The request to the title synthesis system may indicate, among other things, an identifier of the document object for which a good quality title is to be generated (e.g., a URL), a query received from a client, and constraints regarding the presentation of search result data to a user of the client.

At step 605, in response to receiving the request at step 604, the title synthesis system selects one or more title templates that govern the construction of titles for the document object. Embodiments of the invention of not limited to any particular method for selecting title templates. In one embodiment, a set of title templates T are pre-defined or pre-composed and stored in a database such as title template database 414. A set T' from T is then selected. While it is conceivable to identify all possible title templates from T' based on the set of title components obtained for the document object, in a practical embodiment, selection of T' from T is based on one or more of: associations between the document object and one or more title template(s) that belong to set T, the content or type of document object, the query, and the presentation constraints. For example, if the presentation constraints indicate that the query was submitted from a mobile device or other computing device with a relatively small display screen, then a title template that (a) has a lesser number of title component class slots, or (b) has title component class slots that typically are not filled with lengthy title components, may be selected.

At step 606, the title synthesis system completes each selected title template with title components to produce a set of one or more candidate titles. In one embodiment, a selected title template is completed by identifying the title component class slots of the title template. Each slot refers to a particular title component class. To fill a slot, a title component obtained for the document object is selected from the corresponding title component class. All other slots are filled in a similar manner. If more than one title component is available for selection in a title component class, then selection of a title component from the class may be based on the query and presentation constraints to maximize a title quality function. For example, a title component containing some or all of the query terms may be selected over one that does not contain any query terms. Selection of a title component from a title component class may also be based on presentation constraints. For example, if the presentation constraints indicate that the query was submitted from a mobile device or other computing device with a relatively small display screen, then a shorter title component can be selected over a longer title component in the same title component class.

At step 607, the title synthesis system scores and ranks the constructed candidate titles along with any pre-existing candidate titles, and then selects the best scoring title as the title for the document object. Any number of techniques and algorithms may be used to score titles; embodiments of the invention are not limited to any particular scoring technique or scoring algorithm. In one embodiment, each title is scored based on the number and location of query terms in the title, with titles containing query terms and containing those query terms towards the beginning generally scoring higher than other titles. In addition, the scoring of titles and selection of a single title for the document object may take into account other factors such as presentation constraints.

VI. Implementing Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
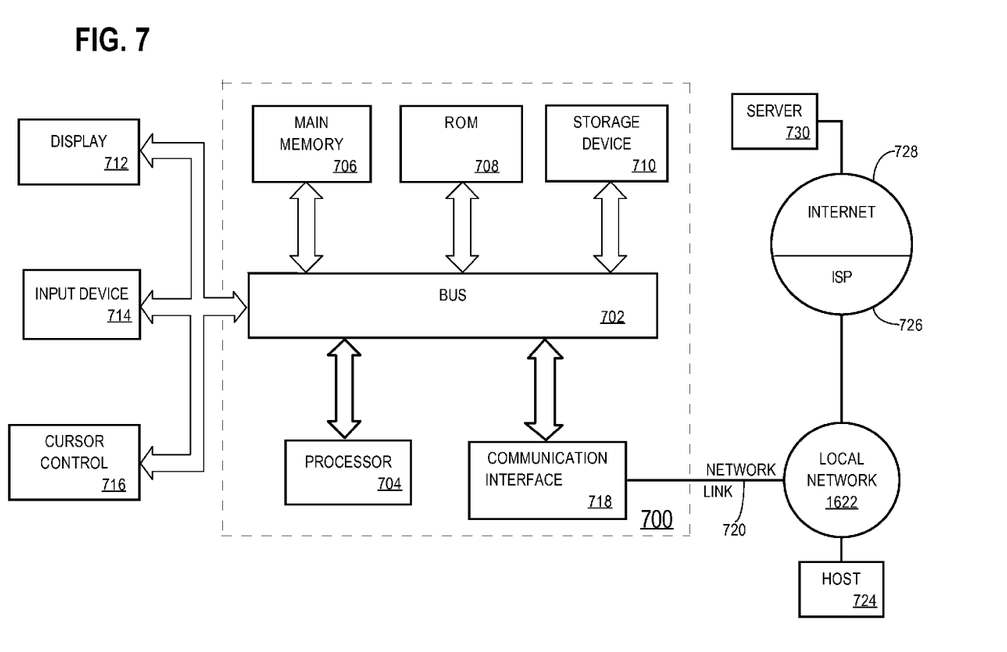
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "non-transitory media" as used herein refers to any media that store data and/or instructions that cause a machine to operation in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

VII. Extension and Alternatives

Titles in search result summaries play a crucial role in a user's search experience. The techniques and title synthesis system described herein provide optimized or near-optimized query-dependent titles for search result summaries. These techniques overcome the limitations of existing systems that treat titles monolithically and do not construct titles from their constituent parts. Other benefits of the techniques and system include: providing a platform for further optimization of title generation, giving greater control over content and flexibility in presentation, and allowing a more principled approach to title-shortening. Further, identifying and storing title components itself can be useful in other search-related areas, such as retrieval and ranking of search results. In addition, the techniques and system described herein are applicable to different domains and multiple languages and for generating titles for applications other than information retrieval.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
obtaining a set of title components for a document;
wherein each title component in the set of title components is a text string;
classifying each title component of the set of title components into at least one title component class of a plurality of title component classes;
selecting a title template from among a plurality of available title templates;
wherein the selected title template has one or more title component slots;
wherein each title component slot of the one or more title component slots corresponds to one title component class of the plurality of title component classes;
generating a candidate title for the document including completing each title component slot of the selected title template with a title component selected from the title component class corresponding to that title component slot;
wherein the generated candidate title is a text string having, as sub-text strings, the title components selected to complete the selected title template;
selecting the candidate title as a title for the document;
wherein the method is performed by one or more computing devices.

2. The method of claim 1,
wherein obtaining the set of title components for the document includes:
obtaining a set of text strings that describe the document, and
generating the set of title components from the set of text strings;
wherein generating the set of title components from the set of text strings includes, for each text string of the set of text strings:
parsing the text string to produce a set of tokens;
classifying each token in the set of tokens as either a separator token or a non-separator token; and
combining one or more non-separator tokens to produce a title component.

3. The method of claim 1, wherein classifying each title component of the set of title components into at least one title component class of the plurality of title component classes is based on a function that measures a confidence that the title component belongs to the at least one title component class.

4. The method of claim 1, wherein selecting the title template from the plurality of available title templates is based on at least one of: a query submitted from a client or presentation constraints associated with the client.

5. The method of claim 1, wherein selecting the candidate title as a title for the document includes:
generating a score for the candidate title based on at least one of:
a query submitted from a client, or
one or more presentation constraints associated with the client, and
selecting the candidate title as a title for the document, from among a plurality of candidate titles that includes the candidate title, based on the generated score.

6. The method of claim 1, further comprising generating the candidate title for the document including completing each title component slot of the selected title template with a title component selected from the title component class corresponding to that title component slot based on at least one of: a query submitted from a client or one or more presentation constraints associated with the client.

7. The method of claim 1, wherein:
the document is a particular document;
the steps of selecting the title template, generating the candidate title, and selecting the candidate title, are performed in response to receiving a query for documents relevant to one or more query terms of the query;
the method further comprises, in response to receiving the query, identifying the particular document as a document relevant to the query terms of the query;
the step of generating a candidate title for the document includes generating the candidate title for a search result summary of the particular document;
the step of selecting the candidate title as the title for the document includes selecting the candidate title as a title for the search result summary of the particular document; and
the method further comprises returning a search result that presents the selected title in the search result summary.

8. The method of claim 7, wherein at least one title component selected to complete a title component slot of the title template is selected based on the query terms of the query.

9. The method of claim 7, wherein selecting the title template includes selecting the title template from among the plurality of available title templates based on the query terms of the query.

10. The method of claim 7, wherein selecting the title template includes selecting the title template from among the plurality of available title templates based on presentation constraints of a client computing device from which the query is received.

11. The method of claim 7, wherein the title template is associated with an identifier of the particular document in a database; and wherein obtaining the title template includes using the identifier of the particular document to obtain the title template from the database.

12. The method of claim 7, wherein the particular document is a web page of a web site.

13. The method of claim 12, wherein a title component class of the plurality of title component classes for the particular document is selected from the group consisting of a name of the web site, a caption of the web site, a description of the web site, a web site section header for a section of the web site from which the web page is available, a topic of the web page, an author of the web page, or a date the web page was published on the web site.

14. One or more non-transitory computer-readable media storing instructions which, when executed by one or more computing devices, cause performance of a method comprising:
obtaining a set of title components for a document;
wherein each title component in the set of title components is a text string;
classifying each title component of the set of title components into at least one title component class of a plurality of title component classes;
selecting a title template from among a plurality of available title templates;

wherein the selected title template has one or more title component slots;

wherein each title component slot of the one or more title component slots corresponds to one title component class of the plurality of title component classes;

generating a candidate title for the document including completing each title component slot of the selected title template with a title component selected from the title component class corresponding to that title component slot;

wherein the generated candidate title is a text string having, as sub-text strings, the title components selected to complete the selected title template;

selecting the candidate title as a title for the document.

15. The one or more non-transitory computer-readable media of claim 14, wherein obtaining the set of title components for the document includes:

obtaining a set of text strings that describe the document, and generating the set of title components from the set of text strings;

wherein generating the set of title components from the set of text strings includes, for each text string of the set of text strings:

parsing the text string to produce a set of tokens;

classifying each token in the set of tokens as either a separator token or a non-separator token; and combining one or more non-separator tokens to produce a title component.

16. The one or more non-transitory computer-readable media of claim 14, wherein classifying each title component of the set of title components into at least one title component class of the plurality of title component classes is based on a function that measures a confidence that the title component belongs to the at least one title component class.

17. The one or more non-transitory computer-readable media of claim 14, wherein selecting the title template from the plurality of available title templates is based on at least one of: a query submitted from a client or presentation constraints associated with the client.

18. The one or more non-transitory computer-readable media of claim 14, wherein selecting the candidate title as a title for the document includes:

generating a score for the candidate title based on at least one of:

a query submitted from a client, or one or more presentation constraints associated with the client, and selecting the candidate title as a title for the document, from among a plurality of candidate titles that includes the candidate title, based on the generated score.

19. The one or more non-transitory computer-readable media of claim 14, the method further comprising generating the candidate title for the document including completing each title component slot of the selected title template with a title component selected from the title component class corresponding to that title component slot based on at least one of:

a query submitted from a client, or one or more presentation constraints associated with the client.

20. The one or more non-transitory computer-readable media of claim 14 wherein:

the document is a particular document;

the steps of selecting the title template, generating the candidate title, and selecting the candidate title, are performed in response to receiving a query for documents relevant to one or more query terms of the query;

the method further comprises, in response to receiving the query, identifying the particular document as a document relevant to the query terms of the query;

the step of generating a candidate title for the document includes generating the candidate title for a search result summary of the particular document;

the step of selecting the candidate title as the title for the document includes selecting the candidate title as a title for the search result summary of the particular document; and the method further comprises returning a search result that presents the selected title in the search result summary.

21. The one or more non-transitory computer-readable media of claim 20, wherein at least one title component selected to complete a title component slot of the title template is selected based on the query terms of the query.

22. The one or more non-transitory computer-readable media of claim 20, wherein selecting the title template includes selecting the title template from among the plurality of available title templates based on the query terms of the query.

23. The one or more non-transitory computer-readable media of claim 20, wherein selecting the title template includes selecting the title template from among the plurality of available title templates based on presentation constraints of a client computing device from which the query is received.

24. The one or more non-transitory computer-readable media of claim 20, wherein the title template is associated with an identifier of the particular document in a database; and wherein obtaining the title template includes using the identifier of the particular document to obtain the title template from the database.

25. The one or more non-transitory computer-readable media of claim 20, wherein the particular document is a web page of a web site.

26. The one or more non-transitory computer-readable media of claim 25, wherein a title component class of the plurality of title component classes for the particular document is selected from the group consisting of a name of the web site, a caption of the web site, a description of the web site, a web site section header for a section of the web site from which the web page is available, a topic of the web page, an author of the web page, or a date the web page was published on the web site.

* * * * *